Sept. 1, 1953     E. F. LINHORST     2,650,494
JOLLY BALANCE
Filed June 20, 1952
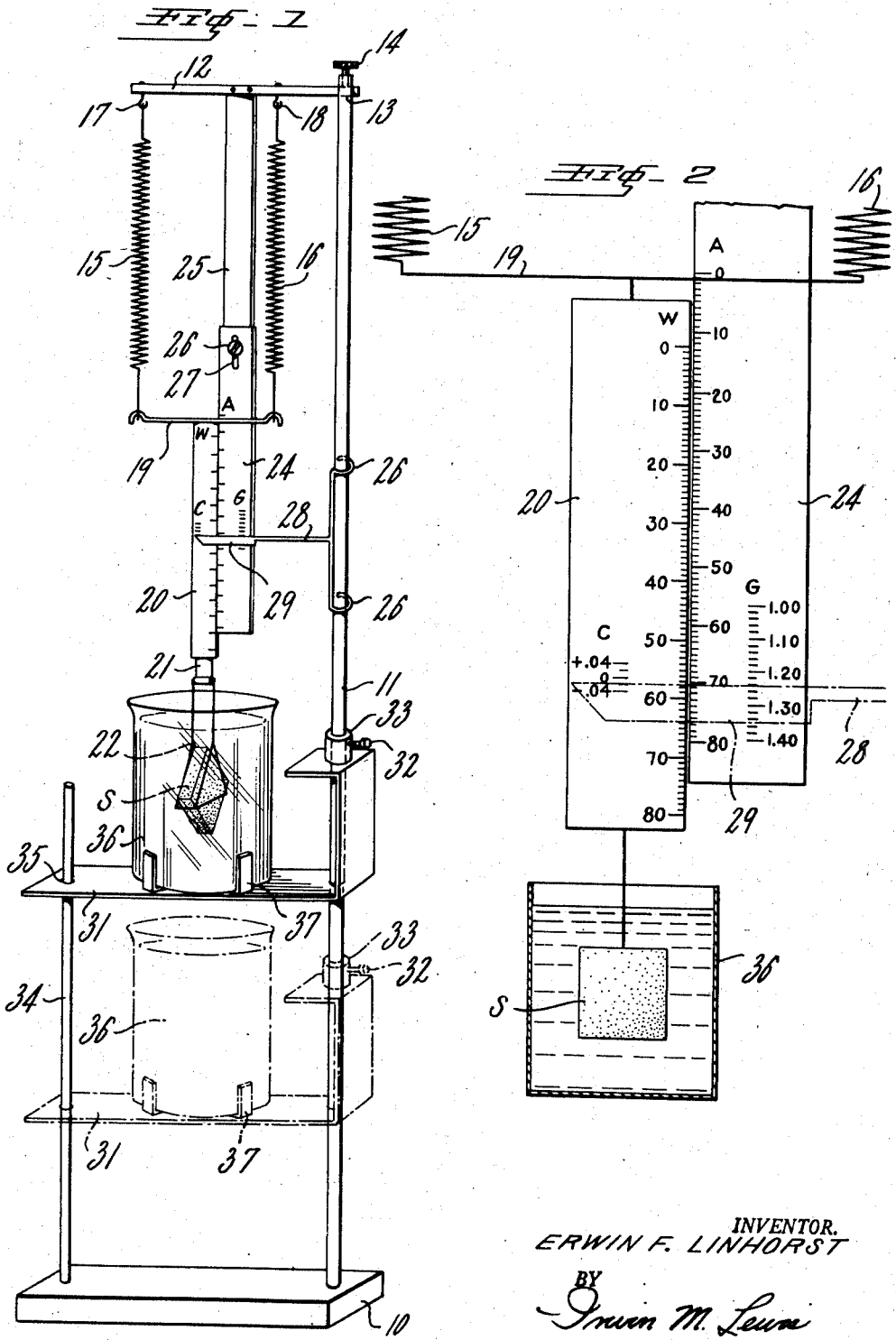
INVENTOR.
ERWIN F. LINHORST
BY
*Irwin M. Lewis*
ATTORNEY Patented Sept. 1, 1953

2,650,494

UNITED STATES PATENT OFFICE 2,650,494

JOLLY BALANCE

Erwin F. Linhorst, Fort Wayne, Ind., assignor to United States Rubber Company, New York, N. Y., a corporation of New Jersey Application June 20, 1952, Serial No. 294,668

4 Claims. (Cl. 73—32)

This invention relates to apparatus for determining specific gravity.

In particular, the invention relates to improvements in a spring balance of the type commonly known as a Jolly balance.

One object of the invention is to provide a Jolly type balance which is of simple, inexpensive construction and which may be easily operated, maintained and adjusted.

Another object of the invention is to provide a Jolly type balance which will give a direct reading proportional to the weight of a sample in air and a direct reading proportional to the apparent loss of weight of a sample in water so that the specific gravity can be computed by merely dividing the first reading by the second.

Another object is to provide a Jolly type balance which will give a direct reading of the approximate specific gravity of a sample of approximately standard dimensions and a direct reading of a correction factor to compensate for the difference of the dimensions of the sample from the standard dimensions, which when added to the reading of the approximate specific gravity will give a more accurate value of the specific gravity.

Other objects and advantages of the present invention will become apparent from the following description when read in conjunction with the accompanying drawings, wherein Fig. 1 is an elevational view of the apparatus of the present invention; and Fig. 2 is an enlarged partial elevational view of the apparatus of the invention showing the details of the graduations of the scales.

Referring to the drawings and in particular to Fig. 1, there is shown one embodiment of the present invention. This embodiment includes a base 10 to which is secured an upright standard 11. A horizontally extending rod 12 is removably secured to the standard 11 adjacent the upper end thereof. The rod 12 is secured to the upper end of the standard 11 by being inserted in a hole 13 provided therein and clamped by means of a set screw 14 threaded in the upper end of the standard 11.

Rod 12 provides a support for two parallel extensible coil springs 15 and 16 which are suspended from spaced eyes 17 and 18 secured to the rod 12. A cross rod 19 extends between the springs 15 and 16 and is secured at each end to the free ends of the springs. A graduated scale 20 is secured to the cross rod 19 intermediate its ends and extends vertically downwardly. The scale 20 is provided with a hook 21 secured to its lower end on which is hung a wire basket 22. The basket 22 is adapted to receive a sample S, the specific gravity of which is to be determined.

A second graduated scale 24 is supported in parallel relationship to the scale 20 by means of a rigid strap 25 which is secured at one end to the rod 12. The scale 24 is adjustably secured to the strap 25 by means of bolt 26 which extends through an elongated slot 27 in the end of the scale 24. The slot 27 allows for vertical adjustment of the scale 24 for a purpose which will hereinafter be described.

A slider 28 is slidably mounted for vertical movement on the standard 11 by means of a clip 26. A flat, rigid blade 29 forming an integral part of the slider 28, extends horizontally across the faces of the scales 20 and 24. The upper edge of the blade 29 serves as a marker for preserving readings on either of these scales.

A vertically adjustable, horizontally extending platform 31 is slidably mounted on the standard 11 and is adapted to be locked in an adjusted position by a thumb screw 32 which is threaded through a bearing sleeve 33 secured to the platform 31. An upright rod 34 secured to the base 10 and extending through a hole 35 in the platform 31 serves to hold the platform 31 in vertical alignment with the scale 24. Platform 31 serves to support a beaker of water 36 and is provided with clips 37 to hold the beaker on the platform 31.

As best shown in Fig. 2, the scale 24 has two sets of graduations, one marked A and one marked G. Scale 20 also has two sets of graduations, one marked W and one marked C. The graduations A on the scale 24 and the graduations W on the scale 20 are identical. For convenience in reading, every tenth graduation is marked by a reference number starting with zero adjacent the top of the scales.

The graduations A and the graduations W are used in determining the specific gravity of a sample of unknown volume. In utilizing the apparatus for determining the specific gravity of such a sample, the scale 24 is first adjusted, if necessary, by loosening bolt 26 and then moving scale 24 until the zero reference number of the graduations A is in alignment with the zero reference number of the graduations W and then tightening bolt 26. The platform 31 and the beaker of water 36 are lowered as shown in dotted lines in Fig. 1, so that the sample when placed in the basket 22 will not be in the water. The sample S is placed in the basket 22 and the weight of the sample stretches the springs 15 and 16 an amount proportional to the weight of the sample in air. The scale 20 moves down with the sample. A reading is then taken on the A graduations of scale 24 using the zero point of the W graduations of scale 20 as an indicator. The slider 28 is then moved down until the blade 29 is in alignment with this reading. The platform 31 and the beaker of water 36 are then raised to completely immerse the sample. In so doing, the sample is buoyed up by a force equal to the weight of the displaced water and the scale 20 moves upwardly under the influence of the springs 15 and 16. A second reading is then made on the graduations W of the scale 20 at the point at which the blade 29 of the slider 28 extends there-across. This reading is proportional to the apparent loss of weight of the sample upon immersion in water. By dividing the reading of the A graduations of scale 24 by the reading on the W graduations of scale 20 at the point that the blade 29 extends there-across the specific gravity of the sample is obtained.

The graduations marked G and C are used together. The G graduations of the scale 24 represent specific gravities of samples of standard volume but of different weights and are marked with such values. The C graduations on scale 20 represent correction factors to be added or subtracted from the specific gravity reading on the G graduations to compensate for the difference in volume of a particular sample from that of a sample of standard volume upon which the G graduations of specific gravity were computed.

These two sets of graduations G and C are particularly useful when it is desired to determine the specific gravity of a number of samples whose volumes vary only a small amount from a standard volume. In such cases the specific gravity may be computed by merely adding the reading on graduations C of the correction factor to the reading on graduations G of the specific gravity.

The operation of the apparatus using these sets of graduations is similar to that in using the graduations A and W. The sample is placed in the basket W and a reading taken on the G graduations using the zero mark on the W graduations of the scale 20 as a reference point. The slider 28 is moved into alignment with this reading. The beaker of water 36 is then raised to immerse the sample and a reading is taken on the C graduations at the point the blade 29 of the slider 28 extends there-across. This correction reading on the C graduations is then added to the approximate specific gravity reading from the G graduations to give a more accurate determination of specific gravity. For example in Fig. 2, the reading of the G graduations is 1.24 and the reading of the C graduations is —.02 giving a specific gravity of 1.22.

The G graduations of scale 24 are calibrated by dividing corresponding values on the A graduations by the displaced volume of a sample of standard volume as taken from the W scale. For example in Fig. 2, the G graduations where calibrated by dividing values of the A graduations by 56.5, the chosen standard volume as measured on the W scale. Thus a specific gravity of 1.00 on the G graduations corresponds to a reading of 56.5 on the A graduations.

The C graduations are calibrated by computing the change in specific gravity of a sample of standard weight occasioned by a change in volume from a standard volume as measured on the W graduations. For example in Fig. 2, the C graduations were calibrated by using a standard weight of 67.8 as measured on the A graduations, which corresponds to a specific gravity of 1.20 on the G graduations at a volume of 56.5 as measured on the W graduations. Using these standards a change in volume of 0.942 from the standard volume of 56.5 as measured on the W scale would give a change in specific gravity of 0.02. Using this value, the C graduations are calibrated and marked as plus or minus on either side of the standard volume 56.5, thereby indicating whether the correction is to be added or subtracted from the reading of the G graduations. Thus a rubber sample that shows an approximate specific gravity of 1.20 on the G graduations and a volume of 55.56 on the W graduations has a corrected specific gravity of 1.22. This is due to its volume being $$\frac{.02}{1.20} \text{ of } 56.5 \text{ (or } 0.94\text{)}$$

less than the standard volume of 56.5 as measured on the W scale. A graduation of 0.02 on the C graduations opposite 55.56 (56.5—0.94) on the W graduations is therefore a correction factor which is exactly correct for a specific gravity of 1.20 as measured on the G graduations and very nearly correct for readings of specific gravity near 1.20 as measured on the G graduations.

From the above description it can be seen that there is provided a Jolly type balance which is of simple inexpensive construction, but which at the same time can be easily adjusted, maintained and operated. The scales 20 and 24 in conjunction with the slider 28 provide for easy reading and the graduations give readings from which the specific gravity may be obtained by a single division or addition computation.

While the apparatus is shown in the drawing and described as having two springs, it is to be understood that this is merely the preferred form because it provides for greater stability and that a single spring could be used. It is also to be understood that other changes and variations may be made in the apparatus shown and described without departing from the spirit and scope of the invention.

Having thus described my invention, what I claim and desire to protect by Letters Patent is:

1. In a Jolly balance having a freely suspended extension spring and means for supporting a sample from the free end of the spring, a first graduated scale secured to the free end of the spring and movable with said sample supporting means and a second normally stationary graduated scale mounted in parallel relationship to the path of movement of said first scale.

2. In a Jolly balance having a freely suspended extension spring and means for supporting a sample from the free end of the spring, a first scale graduated in equal increments secured to the free end of the spring and movable with said supporting means, a second normally stationary graduated scale mounted in parallel relationship to the path of movement of said first scale, the graduations of said second scale being identical to those of said first scale.

3. In a Jolly balance having a freely suspended extension spring and means for supporting a sample from the free end of the spring, a first graduated scale secured to the free end of the spring and movable with said supporting means, a second normally stationary graduated scale mounted in parallel relationship to the path of movement of said first scale, the graduations of said second scale being calibrated in values of specific gravity of samples of constant standard volume, the graduations of said first scale being calibrated in values of difference in specific gravity occasioned by differences in volume from said standard volume.

4. A spring balance for determining the specific gravity of a sample, comprising, a base, an upright standard secured to said base, a supporting member secured to and extending outwardly from said standard at a point spaced a substantial distance from said base, a pair of extension springs suspended in spaced parallel relationship from said supporting member, a cross bar attached at each end to the free ends of said springs, a first graduated scale secured at one end to said cross bar, means attached to the other end of said first scale for supporting a sample, a second normally stationary graduated scale adjustably supported in parallel relationship to said first scale, a vertically adjustable slider providing a straight edge extending across said scales, a horizontally extending platform mounted for vertical adjustment on said standard, and an open liquid container supported on said platform.

ERWIN F. LINHORST.

References Cited in the file of this patent

UNITED STATES PATENTS

| Number | Name | Date |
| --- | --- | --- |
| 1,891,049 | Klopsteg | Dec. 13, 1932 |
| 1,950,963 | Benton | Mar. 13, 1934 |
| 2,387,489 | Bailey | Oct. 23, 1945 |